(12) United States Patent
Linden et al.

(10) Patent No.: US 12,546,150 B2
(45) Date of Patent: Feb. 10, 2026

(54) DOOR ASSEMBLY FOR MOTOR VEHICLE

(71) Applicant: Ford Global Technologies, LLC, Dearborn, MI (US)

(72) Inventors: Howard Paul Tsvi Linden, Southfield, MI (US); Rafic Jergess, Warren, MI (US); Christopher Matthew Radjewski, Macomb Township, MI (US); Onoyom Essien Ekanem, White Lake, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 620 days.

(21) Appl. No.: 17/143,582

(22) Filed: Jan. 7, 2021

(65) Prior Publication Data

US 2022/0213722 A1 Jul. 7, 2022

(51) Int. Cl.
*E05B 85/10* (2014.01)
*E05B 83/36* (2014.01)

(52) U.S. Cl.
CPC .............. *E05B 85/10* (2013.01); *E05B 83/36* (2013.01); *E05Y 2201/624* (2013.01); *E05Y 2400/612* (2013.01)

(58) Field of Classification Search
CPC ... E05B 85/10; E05B 83/36; E05Y 2201/624; E05Y 2400/612
See application file for complete search history.

(56) References Cited

U.S. PATENT DOCUMENTS

| | | | | |
|---|---|---|---|---|
| 4,895,403 A | * | 1/1990 | Osenkowski | E05B 85/107 292/DIG. 31 |
| 5,058,258 A | * | 10/1991 | Harvey | E05B 81/28 292/201 |
| 5,248,175 A | * | 9/1993 | Burns | E05B 79/06 292/DIG. 31 |
| 5,352,004 A | * | 10/1994 | Nedbal | E05B 77/34 292/DIG. 31 |
| 5,369,911 A | * | 12/1994 | Fortunato | G07C 9/00182 49/357 |
| 5,494,322 A | * | 2/1996 | Menke | E05B 77/265 292/201 |
| 5,560,659 A | * | 10/1996 | Dault | E05B 85/18 292/336.3 |

(Continued)

OTHER PUBLICATIONS

Craig Cole, Why the Ford Mustang Mach-E's door handles are so weird (Year: 2019).*

*Primary Examiner* — Quang Pham
(74) *Attorney, Agent, or Firm* — Vichit Chea; Carlson, Gaskey & Olds, P.C.

(57) ABSTRACT

This disclosure relates to a door assembly for a motor vehicle. An example door assembly includes a door free of moveable exterior door handles. Further, the door is mounted relative to an opening in a body of the motor vehicle such that the door is moveable between a fully closed position, a fully open position, and a partially open position between the fully closed and fully open positions. The assembly further includes a switch assembly including a mechanical switch configured to generate a signal when pressed, and a door presenter assembly configured to move the door from the fully closed position to the partially open position in response to the signal from the mechanical switch.

23 Claims, 12 Drawing Sheets

(56) References Cited

U.S. PATENT DOCUMENTS

| | | | | |
|---|---|---|---|---|
| 5,632,516 A * | 5/1997 | Schwab | ............... | E05B 85/18 |
| | | | | 292/DIG. 31 |
| 5,669,642 A * | 9/1997 | Kang | ............... | E05B 77/06 |
| | | | | 292/336.3 |
| 5,964,487 A * | 10/1999 | Shamblin | ............... | E05B 85/22 |
| | | | | 292/144 |
| 6,027,148 A * | 2/2000 | Shoemaker | ............... | E05B 65/0021 |
| | | | | 292/201 |
| 6,039,366 A * | 3/2000 | Lewis | ............... | E05B 85/18 |
| | | | | 292/DIG. 64 |
| 6,070,998 A * | 6/2000 | Jennings | ............... | B60Q 1/2669 |
| | | | | 362/399 |
| 6,089,626 A * | 7/2000 | Shoemaker | ............... | E05B 47/0607 |
| | | | | 292/201 |
| 6,121,758 A * | 9/2000 | Bellina | ............... | H02J 3/1828 |
| | | | | 323/210 |
| 6,256,932 B1 * | 7/2001 | Jyawook | ............... | E05B 77/24 |
| | | | | 292/336.3 |
| 6,412,584 B1 * | 7/2002 | Faigle | ............... | B60R 21/01 |
| | | | | 180/274 |
| 6,441,512 B1 * | 8/2002 | Jakel | ............... | E05B 77/48 |
| | | | | 307/10.2 |
| 6,530,251 B1 * | 3/2003 | Dimig | ............... | E05B 79/20 |
| | | | | 70/237 |
| 6,588,813 B1 * | 7/2003 | Marcarini | ............... | E05B 85/16 |
| | | | | 70/276 |
| 6,669,267 B1 * | 12/2003 | Lynam | ............... | B60J 10/76 |
| | | | | 362/494 |
| 6,698,262 B2 * | 3/2004 | Wittwer | ............... | E05B 77/34 |
| | | | | 292/DIG. 31 |
| 6,779,372 B2 * | 8/2004 | Arlt | ............... | E05B 79/20 |
| | | | | 70/237 |
| 6,786,070 B1 * | 9/2004 | Dimig | ............... | E05B 77/30 |
| | | | | 292/201 |
| 6,803,733 B1 * | 10/2004 | Shabana | ............... | E05F 11/486 |
| | | | | 296/146.12 |
| 6,825,752 B2 * | 11/2004 | Nahata | ............... | E05B 81/78 |
| | | | | 340/545.4 |
| 7,055,997 B2 * | 6/2006 | Baek | ............... | B60Q 3/267 |
| | | | | 362/276 |
| 7,070,018 B2 * | 7/2006 | Kachouh | ............... | E05B 81/14 |
| | | | | 180/287 |
| 7,270,029 B1 * | 9/2007 | Papanikolaou | ............... | E05B 85/01 |
| | | | | 292/201 |
| 7,375,299 B1 * | 5/2008 | Pudney | ............... | E05B 81/78 |
| | | | | 200/61.62 |
| 7,637,631 B2 * | 12/2009 | McDermott | ............... | B60R 25/00 |
| | | | | 362/802 |
| 7,642,669 B2 * | 1/2010 | Spurr | ............... | E05B 81/76 |
| | | | | 307/64 |
| 7,705,722 B2 * | 4/2010 | Shoemaker | ............... | B60H 1/248 |
| | | | | 296/147 |
| 7,791,218 B2 * | 9/2010 | Mekky | ............... | E05B 81/86 |
| | | | | 307/64 |
| 7,810,856 B2 * | 10/2010 | Muller | ............... | E05B 81/20 |
| | | | | 292/336.3 |
| 7,819,442 B2 * | 10/2010 | Ieda | ............... | E05B 81/78 |
| | | | | 292/336.3 |
| 8,405,515 B2 * | 3/2013 | Ishihara | ............... | E05B 81/78 |
| | | | | 340/5.72 |
| 9,156,335 B1 * | 10/2015 | Harter | ............... | E05B 85/10 |
| 9,349,552 B2 * | 5/2016 | Huska | ............... | H01H 13/85 |
| 9,499,127 B2 * | 11/2016 | Pribisic | ............... | G06F 3/0447 |
| 9,518,408 B1 * | 12/2016 | Krishnan | ............... | B60R 25/01 |
| 9,559,689 B2 * | 1/2017 | Adkins | ............... | H03K 17/962 |
| 9,721,403 B2 * | 8/2017 | Müller | ............... | E05B 81/64 |
| 10,119,308 B2 * | 11/2018 | Linden | ............... | E05B 81/76 |
| 10,227,810 B2 * | 3/2019 | Linden | ............... | E05B 81/14 |
| 10,253,533 B1 * | 4/2019 | Pudney | ............... | E05F 1/1016 |
| 10,267,068 B2 * | 4/2019 | Van Wiemeersch | .... | E05B 77/02 |
| 10,273,725 B2 * | 4/2019 | Van Wiemeersch | .... | H04W 4/14 |
| 10,316,553 B2 * | 6/2019 | Krishnan | ............... | E05B 81/14 |
| 10,323,442 B2 * | 6/2019 | Kleve | ............... | E05B 81/14 |
| 10,329,823 B2 * | 6/2019 | Khan | ............... | E05F 15/44 |
| 10,377,343 B2 * | 8/2019 | Krishnan | ............... | G07C 9/00817 |
| 10,394,393 B2 * | 8/2019 | Ramakrishnan | ...... | G06F 3/0418 |
| 10,422,166 B2 * | 9/2019 | Papanikolaou | ......... | H02N 2/186 |
| 10,458,171 B2 * | 10/2019 | Khan | ............... | E05F 15/611 |
| 10,494,838 B2 * | 12/2019 | Patel | ............... | E05B 77/245 |
| 10,526,821 B2 * | 1/2020 | Krishnan | ............... | G07C 9/00182 |
| 10,604,970 B2 * | 3/2020 | Briggs | ............... | E05B 81/14 |
| 10,635,248 B2 * | 4/2020 | Hinson | ............... | G01L 1/142 |
| 10,697,224 B2 * | 6/2020 | Linden | ............... | E05F 15/616 |
| 10,711,494 B2 * | 7/2020 | Bingle | ............... | E05B 81/06 |
| 10,855,394 B1 * | 12/2020 | Lee | ............... | B60R 25/24 |
| 10,907,386 B2 * | 2/2021 | Walawender | ............... | E05F 15/76 |
| 10,954,701 B2 * | 3/2021 | Ichinose | ............... | E05B 81/14 |
| 10,969,910 B2 * | 4/2021 | Salter | ............... | G06F 3/04883 |
| 10,975,601 B2 * | 4/2021 | Beck | ............... | E05B 85/10 |
| 11,131,117 B2 * | 9/2021 | Shah | ............... | H03K 17/94 |
| 11,352,820 B2 * | 6/2022 | Tylla | ............... | E05B 85/103 |
| 11,365,570 B2 * | 6/2022 | Beck | ............... | E05B 81/77 |
| 11,371,270 B2 * | 6/2022 | Leonardi | ............... | E05B 81/86 |
| 11,377,898 B2 * | 7/2022 | Sugiura | ............... | E05F 15/73 |
| 11,554,646 B2 * | 1/2023 | Walawender | ............... | E05B 85/12 |
| 11,619,079 B2 * | 4/2023 | Linden | ............... | E05B 81/77 |
| | | | | 292/336.3 |
| 11,624,228 B1 * | 4/2023 | Austria | ............... | E05F 15/43 |
| | | | | 340/5.72 |
| 11,927,036 B2 * | 3/2024 | Spick | ............... | H03K 17/9545 |
| 2001/0028297 A1 * | 10/2001 | Hara | ............... | G07C 9/00309 |
| | | | | 340/5.2 |
| 2002/0121786 A1 * | 9/2002 | Meinke | ............... | E05B 77/42 |
| | | | | 292/336.3 |
| 2002/0180707 A1 * | 12/2002 | Sato | ............... | G06F 3/0202 |
| | | | | 345/169 |
| 2003/0001729 A1 * | 1/2003 | Ieda | ............... | B60R 25/246 |
| | | | | 340/693.9 |
| 2003/0025337 A1 * | 2/2003 | Suzuki | ............... | E05B 83/40 |
| | | | | 292/201 |
| 2003/0029210 A1 * | 2/2003 | Budzynski | ............... | E05B 85/10 |
| | | | | 70/264 |
| 2003/0031025 A1 * | 2/2003 | Huizenga | ............... | B60Q 1/2669 |
| | | | | 362/85 |
| 2003/0107469 A1 * | 6/2003 | Emmerling | ............... | B60R 25/24 |
| | | | | 340/5.72 |
| 2003/0111863 A1 * | 6/2003 | Weyerstall | ............... | E05B 79/20 |
| | | | | 296/146.1 |
| 2003/0122556 A1 * | 7/2003 | Sueyoshi | ............... | E05B 85/16 |
| | | | | 324/686 |
| 2003/0182762 A1 * | 10/2003 | Koops | ............... | E05B 17/0016 |
| | | | | 16/412 |
| 2003/0184098 A1 * | 10/2003 | Aiyama | ............... | E05B 81/78 |
| | | | | 292/216 |
| 2004/0135380 A1 * | 7/2004 | Bruderick | ............... | E05B 85/18 |
| | | | | 292/336.3 |
| 2004/0177478 A1 * | 9/2004 | Louvel | ............... | E05B 79/06 |
| | | | | 16/430 |
| 2004/0179313 A1 * | 9/2004 | Cleveland | ............... | H01H 9/542 |
| | | | | 361/2 |
| 2004/0183651 A1 * | 9/2004 | Mafune | ............... | B60R 25/246 |
| | | | | 340/5.7 |
| 2004/0201226 A1 * | 10/2004 | Spurr | ............... | E05B 81/14 |
| | | | | 292/201 |
| 2004/0222649 A1 * | 11/2004 | Ito | ............... | E05B 85/14 |
| | | | | 292/336.3 |
| 2005/0068712 A1 * | 3/2005 | Schulz | ............... | H03K 17/955 |
| | | | | 361/287 |
| 2005/0083174 A1 * | 4/2005 | Nakamura | ............... | E05B 81/78 |
| | | | | 340/5.72 |
| 2005/0146147 A1 * | 7/2005 | Niskanen | ............... | E05B 81/00 |
| | | | | 292/336.3 |
| 2005/0230237 A1 * | 10/2005 | Ieda | ............... | E05B 81/78 |
| | | | | 200/600 |
| 2005/0231364 A1 * | 10/2005 | Nitawaki | ............... | E05B 85/01 |
| | | | | 340/545.7 |
| 2005/0236846 A1 * | 10/2005 | Hidaka | ............... | E05B 81/78 |
| | | | | 292/216 |

(56) References Cited

U.S. PATENT DOCUMENTS

| | | | |
|---|---|---|---|
| 2006/0132282 A1* | 6/2006 | McCall | B60R 1/12 340/5.2 |
| 2006/0143857 A1* | 7/2006 | Freyholdt | E05B 81/76 16/110.1 |
| 2006/0170411 A1* | 8/2006 | Kurachi | H03K 17/955 324/132 |
| 2006/0224290 A1* | 10/2006 | Nakashima | B60R 25/24 701/1 |
| 2006/0232378 A1* | 10/2006 | Ogino | G07C 9/00309 340/5.72 |
| 2006/0262549 A1* | 11/2006 | Schmidt | G07C 9/0069 362/459 |
| 2007/0026869 A1* | 2/2007 | Dunko | G06F 3/017 455/456.1 |
| 2007/0069531 A1* | 3/2007 | Herbert | E05B 85/107 292/336.3 |
| 2007/0091627 A1* | 4/2007 | Nitawaki | G07C 9/00309 362/501 |
| 2007/0132553 A1* | 6/2007 | Nakashima | E05B 77/48 340/5.72 |
| 2007/0180869 A1* | 8/2007 | Geyer | D06F 39/14 68/196 |
| 2007/0216174 A1* | 9/2007 | Tanimoto | E05B 81/78 292/336.3 |
| 2007/0216175 A1* | 9/2007 | Tanimoto | E05B 81/78 292/336.3 |
| 2008/0021619 A1* | 1/2008 | Steegmann | E05B 81/78 70/276 |
| 2008/0061933 A1* | 3/2008 | Ieda | E05B 81/78 340/5.72 |
| 2008/0068857 A1* | 3/2008 | Meinke | B60Q 1/503 362/546 |
| 2008/0088138 A1* | 4/2008 | Inoue | E05B 81/20 701/49 |
| 2008/0103664 A1* | 5/2008 | Hata | F16H 61/0213 701/55 |
| 2008/0163555 A1* | 7/2008 | Thomas | E05B 85/01 292/336.3 |
| 2008/0202912 A1* | 8/2008 | Boddie | H03K 17/962 200/600 |
| 2008/0224482 A1* | 9/2008 | Cumbo | E05B 81/40 292/201 |
| 2008/0250607 A1* | 10/2008 | Ito | E05B 81/78 16/412 |
| 2009/0025501 A1* | 1/2009 | Mitteer | F16H 61/22 74/473.12 |
| 2009/0039671 A1* | 2/2009 | Thomas | E05B 85/107 292/336.3 |
| 2009/0043456 A1* | 2/2009 | Shahidi | B60R 21/0136 701/49 |
| 2009/0096468 A1* | 4/2009 | Hirota | B60N 2/0276 297/391 |
| 2009/0133510 A1* | 5/2009 | Witte | H03K 17/94 73/862.626 |
| 2009/0160211 A1* | 6/2009 | Krishnan | E05B 81/78 292/216 |
| 2009/0257241 A1* | 10/2009 | Meinke | B60Q 1/543 362/546 |
| 2009/0279826 A1* | 11/2009 | Ieda | G02B 6/0008 292/336.3 |
| 2009/0289469 A1* | 11/2009 | Thiele | E05F 15/42 340/425.5 |
| 2009/0309971 A1* | 12/2009 | Schuetz | E05B 81/78 292/201 |
| 2010/0007463 A1* | 1/2010 | Dingman | E05B 81/78 340/425.5 |
| 2010/0011821 A1* | 1/2010 | Kim | E05B 41/00 70/264 |
| 2010/0187838 A1* | 7/2010 | Ieda | E05B 81/78 292/336.3 |
| 2010/0192329 A1* | 8/2010 | Ieda | E05B 85/16 16/421 |
| 2010/0205780 A1* | 8/2010 | Ieda | E05B 85/16 16/412 |
| 2010/0235057 A1* | 9/2010 | Papanikolaou | E05B 81/14 701/49 |
| 2010/0235058 A1* | 9/2010 | Papanikolaou | E05B 81/64 701/49 |
| 2010/0235059 A1* | 9/2010 | Krishnan | E05B 81/64 701/49 |
| 2010/0237635 A1* | 9/2010 | Ieda | E05B 81/78 292/336.3 |
| 2010/0271049 A1* | 10/2010 | Van Gastel | G01R 27/2605 324/679 |
| 2011/0025522 A1* | 2/2011 | Peschl | H03K 17/955 340/686.6 |
| 2011/0148575 A1* | 6/2011 | Sobecki | E05B 5/006 292/336.3 |
| 2011/0260831 A1* | 10/2011 | Ieda | B60R 25/246 340/5.64 |
| 2012/0019014 A1* | 1/2012 | Tateishi | E05B 85/16 292/336.3 |
| 2012/0119524 A1* | 5/2012 | Bingle | E05B 81/78 292/336.3 |
| 2012/0133159 A1* | 5/2012 | Tateishi | E05B 81/77 292/336.3 |
| 2012/0133563 A1* | 5/2012 | Naka | H01Q 7/08 343/713 |
| 2012/0154587 A1 | 6/2012 | Hwang | |
| 2012/0205924 A1* | 8/2012 | Muller | E05B 85/107 292/336.3 |
| 2012/0228886 A1* | 9/2012 | Muller | E05B 85/107 292/336.3 |
| 2012/0247161 A1* | 10/2012 | Muller | E05B 85/107 70/91 |
| 2012/0267914 A1* | 10/2012 | Thiele | B60J 5/06 296/146.9 |
| 2012/0327025 A1* | 12/2012 | Huska | H01H 13/85 345/174 |
| 2013/0079984 A1* | 3/2013 | Aerts | G07C 9/00944 292/336.3 |
| 2013/0130674 A1* | 5/2013 | De Wind | B60Q 1/2669 362/546 |
| 2013/0170241 A1* | 7/2013 | Lesueur | E05B 77/42 70/91 |
| 2014/0000165 A1* | 1/2014 | Patel | E05B 81/77 292/201 |
| 2014/0303852 A1* | 10/2014 | Seki | E05F 15/40 701/49 |
| 2015/0022994 A1* | 1/2015 | Bingle | G01D 13/20 362/23.01 |
| 2015/0048846 A1* | 2/2015 | Post | G06F 3/041 324/663 |
| 2015/0203056 A1* | 7/2015 | Adkins | H01H 23/025 29/622 |
| 2015/0353033 A1* | 12/2015 | Pribisic | H03K 17/962 307/115 |
| 2015/0376914 A1* | 12/2015 | Derry | B21D 5/00 16/412 |
| 2016/0208520 A1* | 7/2016 | Jordan | E05B 65/46 |
| 2016/0221501 A1* | 8/2016 | Linden | E05B 77/48 |
| 2016/0224973 A1* | 8/2016 | Van Os | G06Q 20/3224 |
| 2016/0251880 A1* | 9/2016 | Bingle | E05B 81/76 701/49 |
| 2016/0273248 A1* | 9/2016 | Mittelbach | E05C 3/14 |
| 2017/0058588 A1* | 3/2017 | Wheeler | E05F 15/63 |
| 2017/0260778 A1* | 9/2017 | Witte | G07C 9/00174 |
| 2017/0335597 A1* | 11/2017 | Lin | E05B 1/0015 |
| 2018/0051502 A1* | 2/2018 | Roos | E05B 81/20 |
| 2018/0367139 A1* | 12/2018 | Pribisic | H03K 17/9622 |
| 2019/0020340 A1* | 1/2019 | Pearson | G06F 3/0383 |
| 2019/0078359 A1* | 3/2019 | Zhang | E05B 77/08 |
| 2019/0085600 A1* | 3/2019 | Leonardi | E05B 81/90 |
| 2019/0152433 A1* | 5/2019 | Cumbo | G07C 9/00714 |
| 2020/0011096 A1* | 1/2020 | Leonardi | E05B 81/78 |
| 2020/0106878 A1* | 4/2020 | Catalano | H04M 1/72454 |
| 2020/0254972 A1* | 8/2020 | De Wind | E05B 85/10 |
| 2020/0256112 A1* | 8/2020 | Williams | E05F 15/71 |
| 2020/0277810 A1* | 9/2020 | Salter | E05F 15/611 |

(56) References Cited

U.S. PATENT DOCUMENTS

| | | | |
|---|---|---|---|
| 2021/0148144 A1* | 5/2021 | Schatz | B60R 25/246 |
| 2021/0222468 A1* | 7/2021 | Dong | E05B 63/22 |
| 2021/0293074 A1* | 9/2021 | Morosawa | E05F 15/73 |
| 2022/0205288 A1* | 6/2022 | Carmo | E05B 47/0038 |
| 2023/0003059 A1* | 1/2023 | Sieg | E05B 81/78 |

* cited by examiner

DOOR ASSEMBLY FOR MOTOR VEHICLE

TECHNICAL FIELD

This disclosure relates to a door assembly for a motor vehicle.

BACKGROUND

Motor vehicles are known to include doors, which are mounted to a body of the motor vehicle and are moveable between closed and open positions to selectively cover and uncover openings in the body of the motor vehicle. Moving a door to an open position permits users to enter or exit the vehicle and/or permits users to insert items into, or retrieve items from, the vehicle. Vehicle doors can be opened manually or may be capable of partially or fully opening automatically using powered systems.

SUMMARY

A door assembly for a motor vehicle according to an exemplary aspect of the present disclosure includes, among other things, a door free of moveable exterior door handles. The door is mounted relative to an opening in a body of the motor vehicle such that the door is moveable between a fully closed position, a fully open position, and a partially open position between the fully closed and fully open positions. The assembly further includes a switch assembly including a mechanical switch configured to generate a signal when pressed, and a door presenter assembly configured to move the door from the fully closed position to the partially open position in response to the signal from the mechanical switch.

In a further non-limiting embodiment of the foregoing door assembly, the assembly includes a latch assembly configured to selectively lock and unlock the door, and the latch assembly is configured to unlock the door in response to the signal from the mechanical switch.

In a further non-limiting embodiment of any of the foregoing door assemblies, the switch assembly includes a capacitive switch configured to generate a signal when pressed, and the latch assembly is configured to lock the door in response to the signal from the capacitive switch.

In a further non-limiting embodiment of any of the foregoing door assemblies, the latch assembly and door presenter assembly are not responsive to simultaneous signals from the mechanical switch and the capacitive switch unless the simultaneous signals are continuously received for a period of time.

In a further non-limiting embodiment of any of the foregoing door assemblies, after continuously receiving the simultaneous signals for the period of time and if the simultaneous signals persist, the latch assembly and door presenter assembly are responsive to the signal from the mechanical switch and not the signal from the capacitive switch.

In a further non-limiting embodiment of any of the foregoing door assemblies, at least one of the switch assembly, the door presenter assembly, and the latch assembly includes a reserve battery.

In a further non-limiting embodiment of any of the foregoing door assemblies, the switch assembly is mounted relative to an applique adjacent a rear edge of the door.

In a further non-limiting embodiment of any of the foregoing door assemblies, the mechanical switch is accessible via a hole in the applique.

In a further non-limiting embodiment of any of the foregoing door assemblies, a fixed door handle projects outward from an exterior surface of the door, and the fixed door handle is configured to permit a user to manually move the door from the partially open position to the fully open position.

In a further non-limiting embodiment of any of the foregoing door assemblies, the door includes trim, and the fixed door handle is vertically aligned with the trim and exhibits substantially the same height as the trim.

In a further non-limiting embodiment of any of the foregoing door assemblies, the fixed door handle provides a slot open facing a rear of the vehicle.

In a further non-limiting embodiment of any of the foregoing door assemblies, the slot is sized so as to fit no more than three fingers of an average-sized adult hand.

In a further non-limiting embodiment of any of the foregoing door assemblies, a portion of the fixed door handle projects rearward of the rear edge of the door.

In a further non-limiting embodiment of any of the foregoing door assemblies, the door is a front door of the motor vehicle.

In a further non-limiting embodiment of any of the foregoing door assemblies, the mechanical switch includes a button having a perimeter and a light arranged within the perimeter of the button, the light is configured to illuminate in the form of a ring, and the button covers the light and is semi-transparent such that, when the light is activated, the light is visible through the button.

A motor vehicle according to an exemplary aspect of this disclosure includes, among other things, a door free of moveable exterior door handles. The door is mounted relative to an opening in a body of the motor vehicle such that the door is moveable between a fully closed position, a fully open position, and a partially open position between the fully closed and fully open positions. The motor vehicle further includes a switch assembly including a mechanical switch configured to generate a signal when pressed, a door presenter assembly configured to move the door from the fully closed position to the partially open position in response to the signal from the mechanical switch, and a fixed door handle on an exterior of the door. The fixed door handle is configured to permit a user to manually move the door from the partially open position to the fully open position.

In a further non-limiting embodiment of the foregoing motor vehicle, the switch assembly is mounted relative to an applique of the door, the door includes trim, the fixed door handle is vertically aligned with the trim and exhibits substantially the same height as the trim, the fixed door handle provides a slot open facing a rear of the vehicle, and a portion of the fixed door handle projects rearward of the rear edge of the door.

In a further non-limiting embodiment of any of the foregoing motor vehicles, the door is a front door of the motor vehicle, the motor vehicle further comprises a rear door, the rear door is free of any exterior handles, the rear door includes a switch assembly including a mechanical switch, and the rear door includes a door presenter configured to move the rear door to a partially open position in response to a signal from the mechanical switch of the rear door.

A method according to an exemplary aspect of the present disclosure includes, among other things, disregarding for a period of time simultaneous signals from a capacitive switch and a mechanical switch of a switch assembly of a door of a motor vehicle such that a latch assembly and a door presenter assembly are not responsive to the simultaneous signals for the period of time. The method further includes, after the period of time, if the simultaneous signals persist, activating the door presenter assembly and the latch assembly.

In a further non-limiting embodiment of the foregoing method, after the activating step, manually moving the door to a fully open position using a fixed door handle on an exterior of the door.

BRIEF DESCRIPTION OF THE DRAWINGS

In FIG. 8, the first door is in a fully closed position.

In FIG. 10, the first door is in the partially open position and is being moved by the user to a fully open position.

DETAILED DESCRIPTION

This disclosure relates to a door assembly for a motor vehicle. An example door assembly includes a door free of moveable exterior door handles. Further, the door is mounted relative to an opening in a body of the motor vehicle such that the door is moveable between a fully closed position, a fully open position, and a partially open position between the fully closed and fully open positions. The assembly further includes a switch assembly including a mechanical switch configured to generate a signal when pressed, and a door presenter assembly configured to move the door from the fully closed position to the partially open position in response to the signal from the mechanical switch. This disclosure provides a number of benefits which will be appreciated from the following description.

Figure 1:
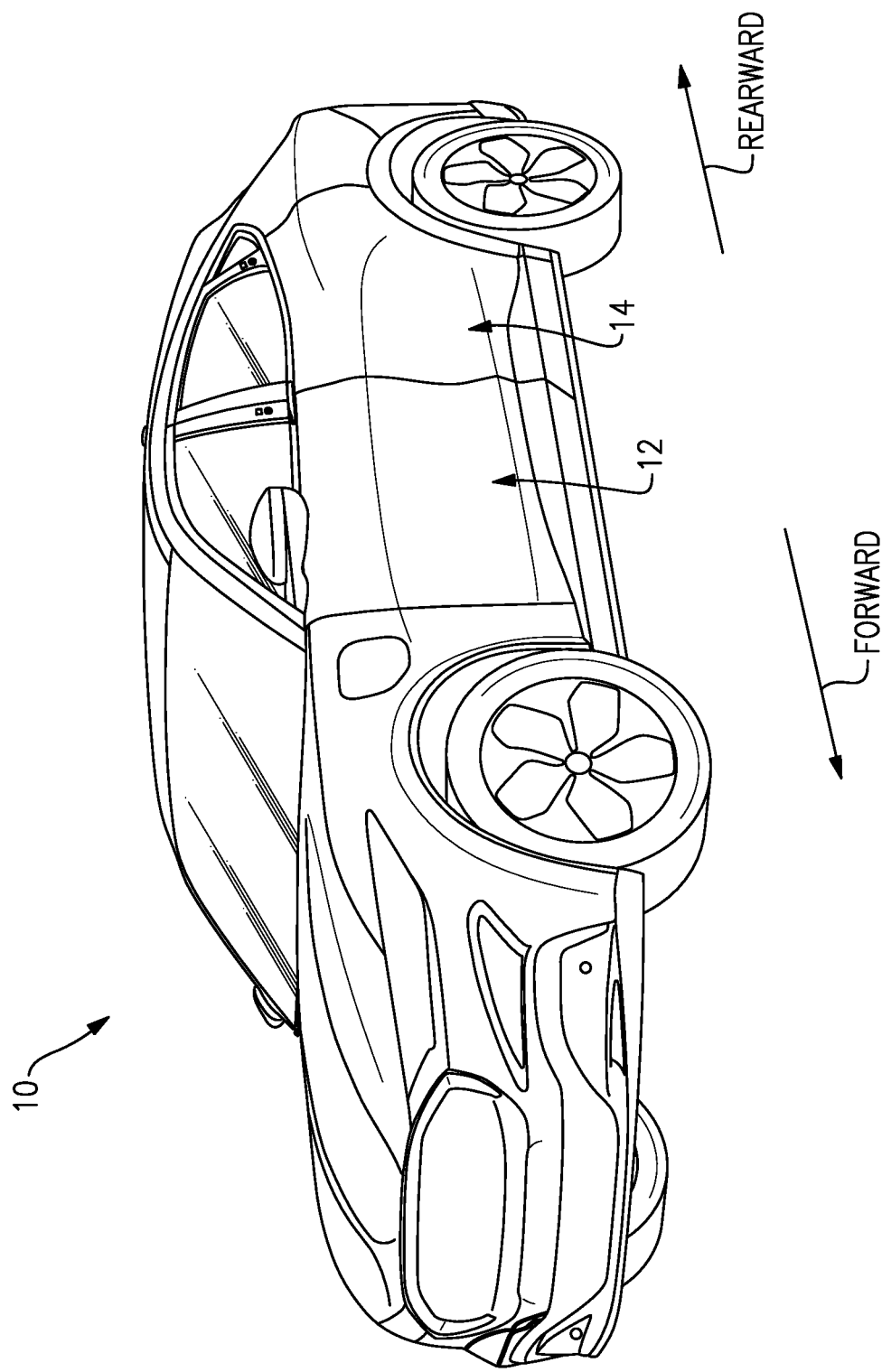
FIG. 1 is a front perspective view of a side of an example motor vehicle.

Referring to the drawings, FIG. 1 is a front-perspective view of a first side, which in countries such as the United States is typically a driver side, of a motor vehicle 10 ("vehicle 10"). As shown, the vehicle 10 is a crossover sport utility vehicle (CSUV). While a CSUV is pictured, this disclosure is also applicable to other types of vehicles, such as SUVs, cars, vans, and trucks (including pickup trucks). Further, the vehicle 10 could be an electrified vehicle, such as a battery electric vehicle (BEV) or a hybrid electric vehicle (HEV), or another type of vehicle such as a vehicle powered only by an internal combustion engine.

The vehicle 10 includes a first door 12 and a second door 14 rearward of the first door 12. The "forward" and "rearward" directions are labeled in FIG. 1 and some other figures for ease of reference. The first and second doors 12, 14 are mounted to a body of the vehicle 10 such that they are moveable to selectively open and close to uncover and cover respective door openings formed in the body of the vehicle 10. When closed, the first and second doors 12, 14, together with a window, are configured to completely enclose a respective door opening. When the first and second doors 12, 14 are open, users are able to enter and exit the vehicle 10 and/or insert items into, or retrieve items from, the vehicle 10. In this example, the first and second doors 12, 14 are connected to the body of the vehicle 10 by hinged connections permitting the first and second doors 12, 14 to pivot relative to the respective door opening. While FIG. 1 illustrates a first side of the vehicle 10 (e.g., the driver side), it should be understood that the vehicle 10 is substantially symmetrical about its centerline, and that the opposite side (e.g., the passenger side) of the vehicle 10 is arranged similarly, and in particular includes two door openings and two corresponding doors. Further, while in FIG. 1 there are two doors 12, 14, this disclosure extends to vehicles with other door arrangements, including one or more doors on each side of the vehicle.

Figure 2:
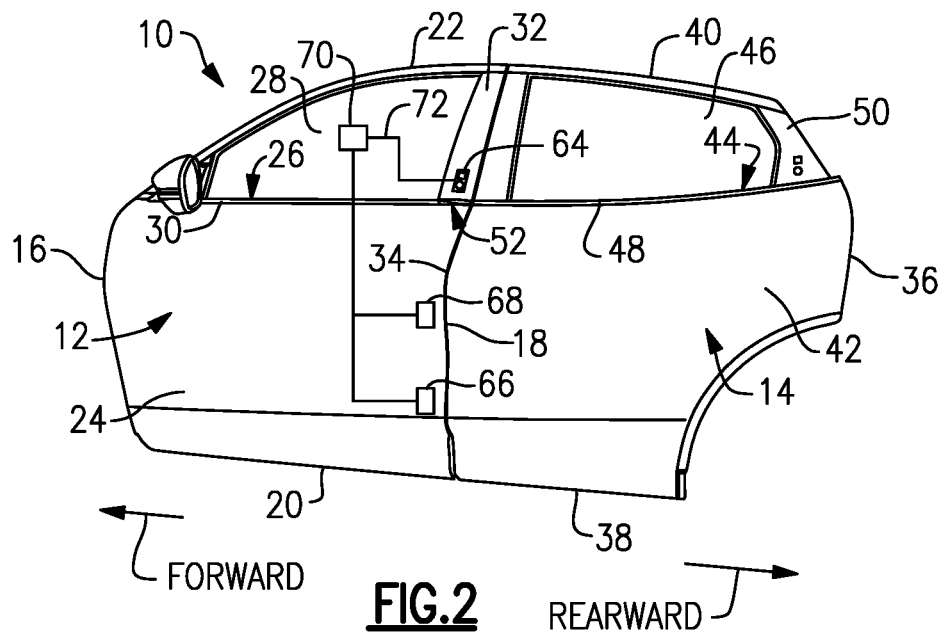
FIG. 2 is a side view of two doors of the motor vehicle of FIG. 1.

FIG. 2 illustrates the doors 12, 14 from an exterior perspective. The exterior of the first door 12 extends in the forward-and-rearward directions between a front edge 16 adjacent an A-pillar of the vehicle 10 and a rear edge 18 adjacent a B-pillar of the vehicle 10. The first door 12 extends vertically (i.e., up-and-down relative to FIG. 2) from a bottom edge 20 adjacent a ground surface to a top edge 22 adjacent a top of the vehicle 10. The first door 12 includes a main body panel 24 extending in the forward-and-rearward directions from the front edge 16 to the rear edge 18 and vertically from the bottom edge 20 to a vertical location 26 below a window opening 28 in the first door 12. At the vertical location 26, the first door 12 includes trim 30 covering a top edge of the main body panel 24 and extending in the forward-and-rearward direction along a bottom of a border of the window opening 28. Adjacent the rear edge 18, the first door 12 also includes a panel, or applique 32, which may be referred to as a B-pillar applique, extending vertically from the trim 30 to the top edge 22 along a rear border of the window opening 28 and such that the applique 32 generally covers a portion of the B-pillar when the first door 12 is closed.

The exterior of the second door 14 is similarly-arranged. In particular, the second door 14 extends in the forward-and-rearward directions between a front edge 34 adjacent a B-pillar of the vehicle 10 and a rear edge 36 adjacent a C-pillar of the vehicle 10. The second door 14 extends vertically from a bottom edge 38 adjacent a ground surface to a top edge 40 adjacent a top of the vehicle 10. The second door 14 includes a main body panel 42 extending in the forward-and-rearward directions from the front edge 34 to the rear edge 36 and vertically from the bottom edge 38 to a vertical location 44 below a window opening 46 in the second door 14. At the vertical location 44, the first door 12 includes trim 48 covering a top edge of the main body panel 42 and extending in the forward-and-rearward directions along a bottom of a border of the window opening 46. Adjacent the rear edge 36, the second door 14 includes a C-pillar applique 50, extending vertically from the trim 48 to the top edge 46 along a rear border of the window opening 46 and such that the applique 50 generally covers a portion of the C-pillar when the second door 14 is closed.

In this disclosure, both the first door 12 and the second door 14 are free of moveable exterior door handles, such as traditional door handles which are moveable to open a door. In particular, the exteriors of the first door 12 and the second door 14 are free of handles having components moveable independent of the respective first or second door 12, 14 and/or handles having components moveable relative to the remainder of the handle to open a respective door 12, 14.

In the example of FIG. 2, the first door 12 includes a fixed door handle 52, which does not move relative to the first door 12 nor does it include components moveable relative to the remainder of the fixed door handle 52. Rather, the fixed door handle 52 is rigidly mounted to the first door 12 and does not include moveable components. Additional detail of the fixed door handle 52 will be discussed below. Further, in the example of FIG. 2, the second door 14 is free of any exterior door handles, fixed or moveable. In this way, the main body panels 24, 42 may be contoured to achieve a desirable aesthetic and improved aerodynamic qualities.

Figure 3:
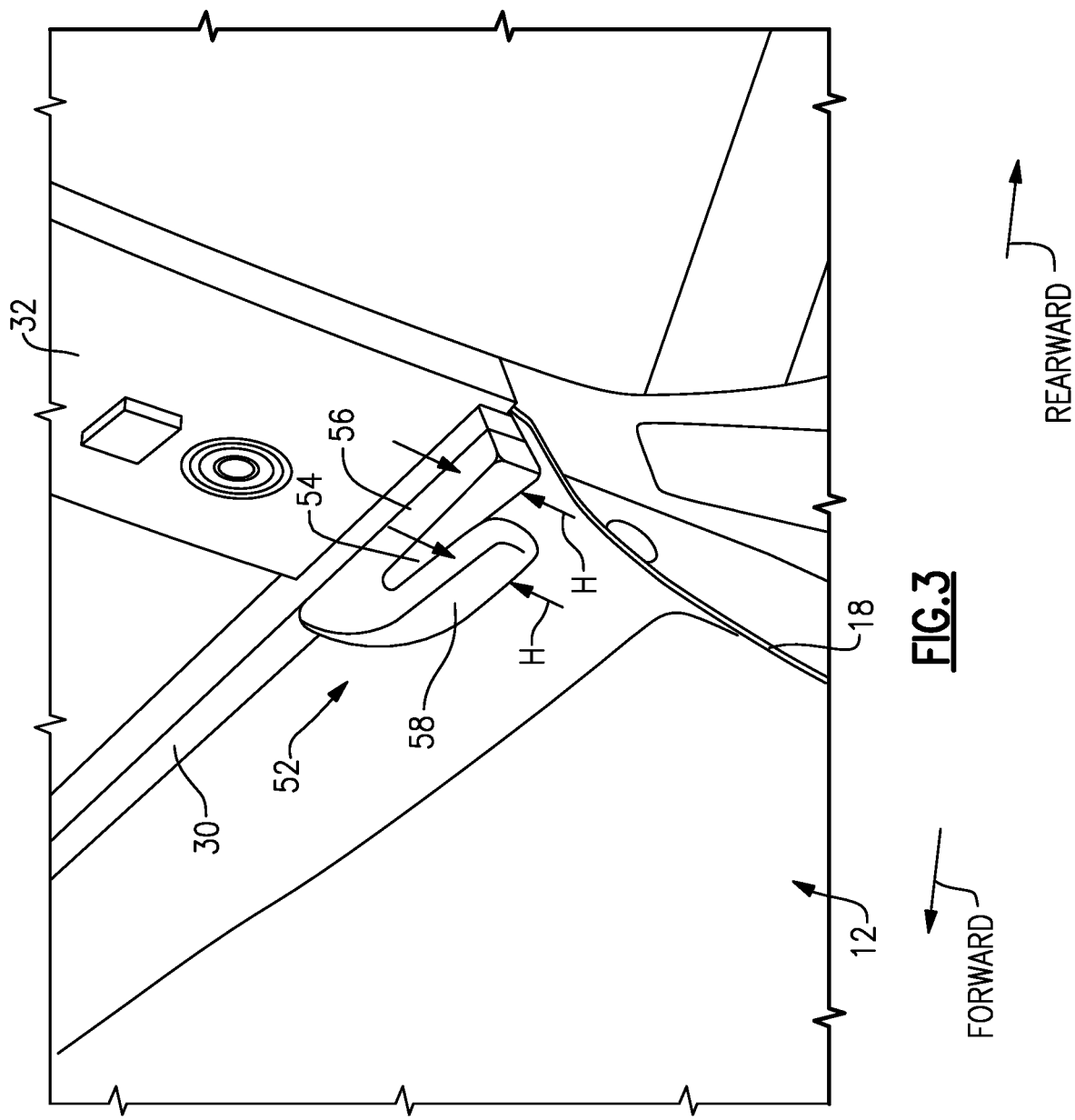
FIG. 3 is a close-up view of a portion of a first door of the motor vehicle, and in particular illustrates a fixed door handle from a rear perspective.
Figure 4:
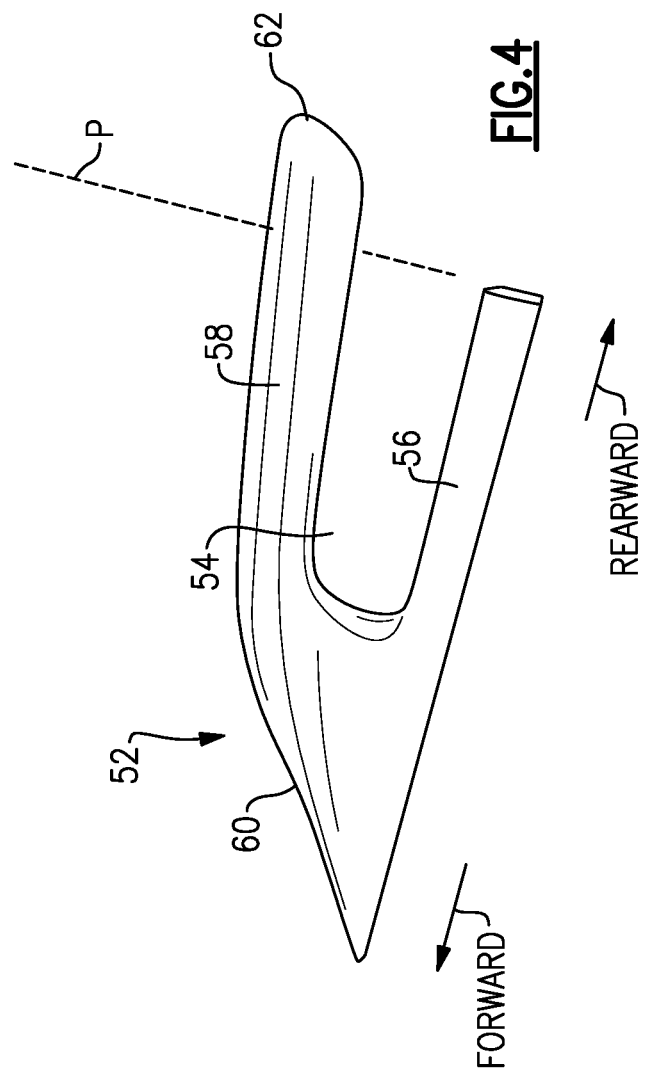
FIG. 4 is a bottom view of the fixed door handle.
Figure 6:
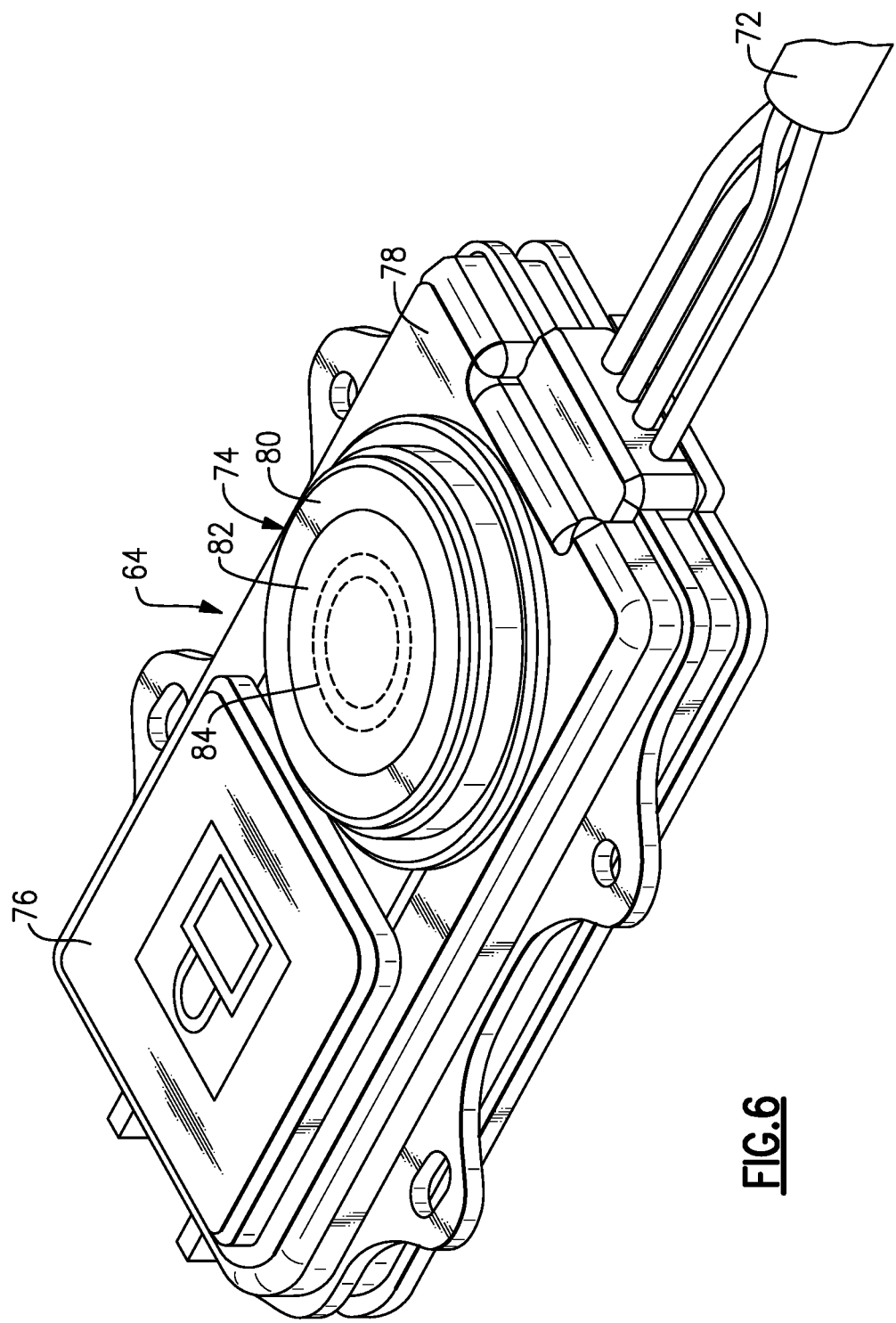
FIG. 6 is a perspective view of a switch assembly.

With reference to FIGS. 3 and 4, the fixed door handle 52 is U-shaped when viewed from above and below (as in FIG. 4) such that the fixed door handle 52 provides a slot 54 open facing a rear of the vehicle 10. The fixed door handle 52 includes a first leg 56 adjacent the first door 12 and a second leg 58 spaced-apart from the first leg 56 by the slot 54. The first and second legs 56, 58 converge at a nose 60, which is forward of the slot 54. The fixed door handle 52, including the first and second legs 56, 58 and the nose 60, is integrally formed as a one-piece structure. In a particular example, the fixed door handle 52 is integrally formed of a single piece of plastic material. The fixed door handle 52 may be attached to the first door 12 using known techniques, including by using fasteners relative to the first leg 56. Without moving parts, the functionality of the fixed door handle 52 is not negatively impacted in cold weather conditions such as when ice forms on the first door 12.

Figure 13:
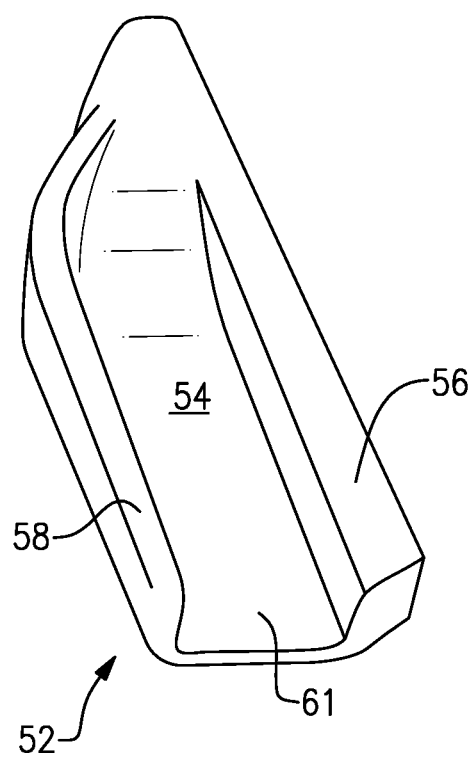
FIG. 13 is a top, perspective view of another example fixed door handle.

In another example, the fixed door handle 52 includes a bottom wall 61 extending between the first and second legs 56, 58, as shown in FIG. 13. The bottom wall 61 spans the entire distance between the first and second legs 56, 58 and provides a bottom boundary of the slot 54.

When the fixed door handle 52 is mounted to the first door 12, a portion of the second leg 58 projects rearward of the rear edge of the first door 12. In particular, FIG. 4 illustrates a plane P containing the rear edge 18 and extending perpendicular to the forward and rearward directions. As shown, a majority of the fixed door handle 52 is on one side of the plane P, namely forward of the plane P, and a portion of the second leg 58 including a free end 62 of the second leg 58 is arranged on an opposite side of the plane P. Thus, at least a portion of the second leg 58 projects rearward of the rear edge 18 to increase the ease with which a user's hand can contact the fixed door handle 52.

An aspect of this disclosure relates to visually blending the fixed door handle 52 into the trim 30, 48. In an example, the fixed door handle 52 is vertically aligned with the trim 30, such that the fixed door handle 52 is provided at the same vertical location along the first door 12 as a portion of the trim 30 adjacent the fixed door handle 52. The fixed door handle 52 is also vertically aligned with a portion of the trim 48 adjacent the fixed door handle 52.

Further, the first and second legs 56, 58 each exhibit a height H (FIG. 3) in a vertical direction which is substantially the same as a corresponding height of the trim 30, 48. The nose 60 also gradually tapers moving in the forward direction so as to blend into the trim 30 and reduce the drag created by the fixed door handle 52.

Additionally, the fixed door handle 52 is not bulky, and is sized so as to be smaller than traditional door handles with moveable parts. For instance, the slot 54 in some examples is sized so as to fit only two fingers of an average sized adult human hand. In another example, the slot 54 is sized so as to fit no more than three fingers of an average sized adult human hand. The reduced size of the fixed door handle 52 not only helps visually blend the fixed door handle 52 into the trim 30, 48 but also reduces the weight of the vehicle 10.

Figure 5:
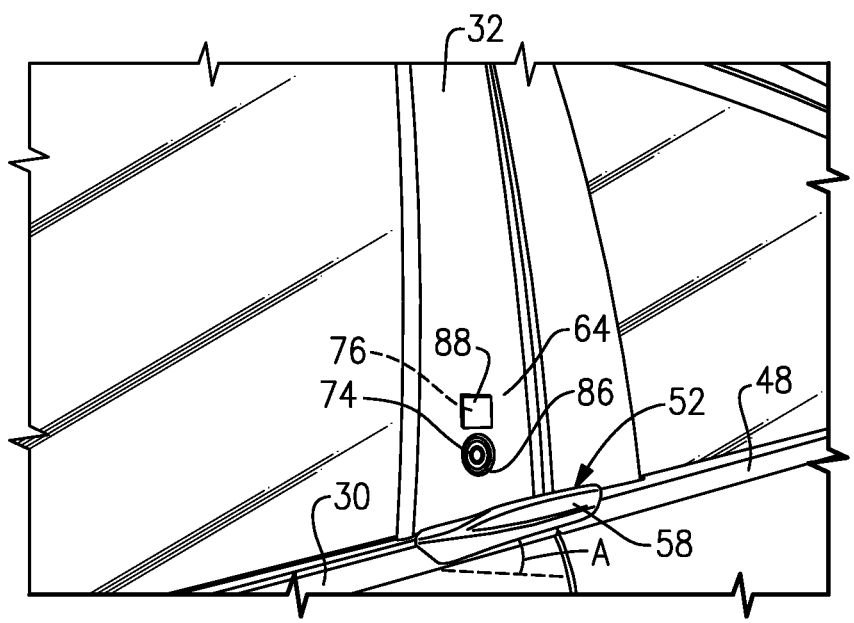
FIG. 5 is a close-up view of a portion of the first door of the motor vehicle, and in particular illustrates the fixed door handle from a front perspective.

Further still, when mounted to the first door 12, the second leg 58 may extend outward from the first door 12 at an acute angle A relative to a ground surface, represented by dashed lines in FIG. 5. The angle A may correspond to an angle at which an exterior surface of the trim 30, 48 is inclined. The fixed door handle 52 may also be of a color matching that of the trim 30, 48.

The above-discussed features contribute to the fixed door handle 52 being perceived as being a part of the trim 30, 48 from various perspectives, despite the second leg 58 projecting outward of the trim 30. In other words, when both the first and second doors 12, 14 are closed, the trim 30, 48 and the fixed door handle 52 visually form a smooth line.

The first and second doors 12, 14 includes a number of electromechanical components. FIG. 2 schematically illustrates some of those components relative to the first door 12. In this example, the first door 12 includes a switch assembly 64 having two user interface buttons, a door presenter assembly 66 configured to partially open the first door 12, a latch assembly 68 configured to selectively hold the first door 12 relative to the body of the vehicle 10, and a controller 70. The second door 14 includes a similar arrangement components. The below discussion focuses on the first door 12, but it equally applies to the second door 14 and the other doors of the vehicle 10.

The controller 70 includes electronics, software, or both, to perform the necessary control functions for operating the vehicle 10 and executing various functions of the first door 12. In one non-limiting embodiment, the controller 70 is a combination vehicle system controller and powertrain control module (VSC/PCM). Although it is shown as a single hardware device, the controller 70 may include multiple controllers in the form of multiple hardware devices, or multiple software controllers within one or more hardware devices. Specifically, the controller 70 could be embodied as separate controllers, with one controller associated with each of the switch assembly 64, the door presenter assembly 66, and the latch assembly 68 instead of or in addition to the shared, centralized controller 70.

A controller area network (CAN) 72 allows the switch assembly 64, the door presenter assembly 66, and the latch assembly 68 to communicate with one another and, when present, to communicate with the controller 70. The CAN 72 may include a plurality of hard-wired connections between the switch assembly 64, the door presenter assembly 66, the latch assembly 68, and the controller 70. When a central controller 70 is not present, the switch assembly 64, the door presenter assembly 66, and the latch assembly 68 may be hard-wired to one another directly. Various connections of the CAN 72 are represented using lines in FIG. 2.

With reference to FIG. 5, the switch assembly 64 includes two switches in this example, both of which are arranged relative to the applique 32 and are spaced-apart above the fixed door handle 52. The switch assembly 64 includes a mechanical switch 74 and a capacitive switch 76 vertically above the mechanical switch 74. The mechanical switch 74 is configured to generate a signal when pressed, and the capacitive switch 76 is configured to generate another, distinct signal when pressed. The mechanical switch 74 includes a moveable button and the capacitive switch 76 includes a capacitive sensor that measures changes in capacitance.

The mechanical and capacitive switches 74, 76 are mounted to a common housing 78, in this example, and are hard-wired via CAN 72 to the door presenter assembly 66, the latch assembly 68, and/or the controller 70. The mechanical and capacitive switches 74, 76 are shaped differently, with the mechanical switch 74 exhibiting a circular shape and the capacitive switch 76 exhibiting a rectangular, and in particular square, shape. This disclosure extends to other shapes.

The mechanical switch 74 includes a circular frame 80 and a button 82 within the frame 80 and moveable relative to the frame 80 when pressed. The button 82 is sealed relative to the frame 80. The button 82 is spring-biased, in this example to an open state in which the mechanical switch 74 does not create a signal. When pressed, the button 82 is moveable to a closed position which generates a signal and which is, in an example, 4-6 mm from the open position.

Within a perimeter of the button 82, and beneath the button 82, the mechanical switch 74 includes a light 84. The light 84 is configured to illuminate in the form of a ring in this example. The light 84 is visible through the button 82. In this regard, the button 82 is made of a transparent or semi-transparent material. The light 84 may be illuminated in one or more colors, such as white, red, or green, to indicate a status of the first door 12, in an example. The light 84 may exhibit a shape other than a ring shape. The mechanical switch 74 has the benefit of being less likely to have its functionality impacted in cold weather conditions such as when ice is present on the switch assembly 64. In other words, if ice is present on the switch assembly 64, a user is more likely to be able to activate the mechanical switch 74. For this and other reasons, the mechanical switch 74 is configured to generate a signal to unlock and open the first door 12.

The housing 78 is mounted behind the applique 32, in this example. With reference to FIG. 5, the applique 32 includes a hole 86 corresponding to the size and shape of the mechanical switch 74 and a raised surface 88 corresponding to the size and shape of the capacitive switch 76. When the switch assembly 64 is mounted to the applique 32, the mechanical switch 74 is within the hole 86 and the capacitive switch 76 is covered by the raised surface 88. The mechanical switch 74, and in particular the button 82, is recessed slightly inward from an exterior surface of the applique 32. The raised surface 88, on the other hand, is raised above a remainder of the exterior surface of the applique 32. The raised surface 88 may exhibit a lock symbol or be at least semi-transparent to reveal a lock symbol on the capacitive switch 76, as examples. At least the raised surface 88 of the applique 32 is made of a material such that the capacitive switch 76 is able to be pressed indirectly by a user's finger contacting the raised surface 88. The raised surface 88 need not be raised in all examples and could instead be flush with the applique 32.

Figure 7:
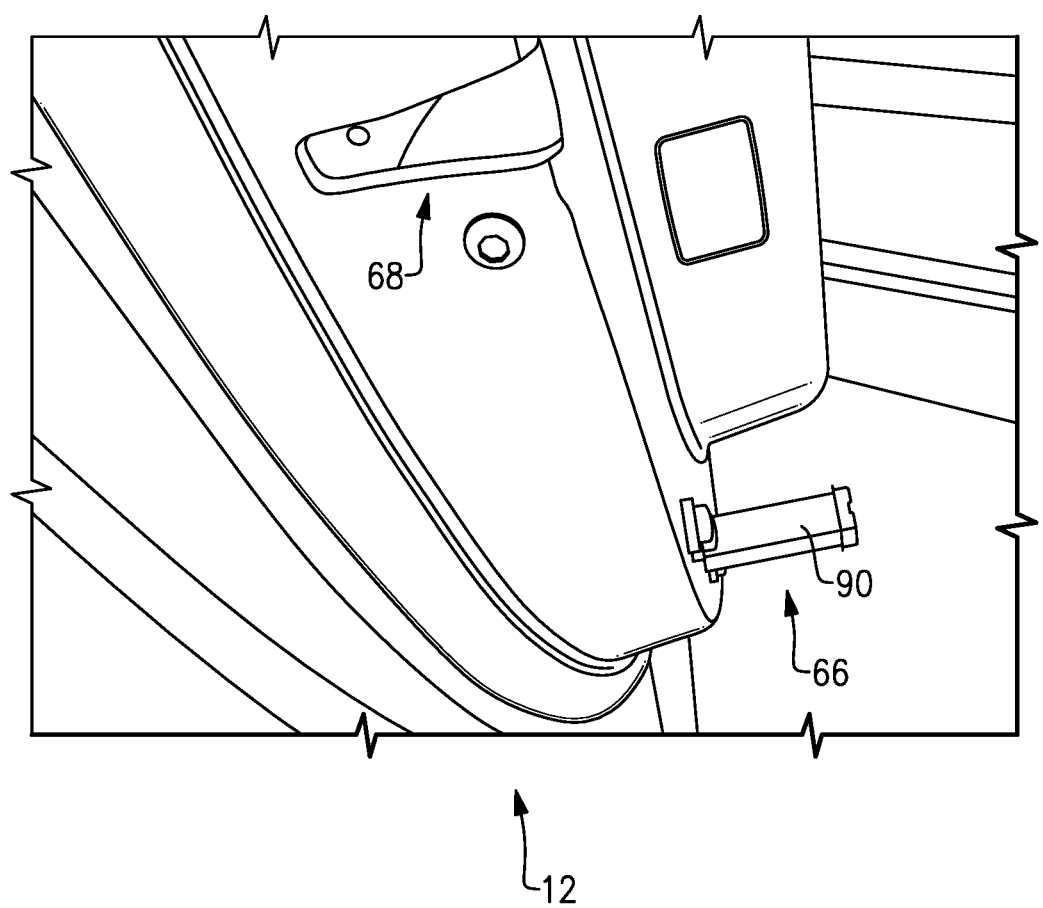
FIG. 7 is a view of a portion of the first door, and illustrates portions of a latch assembly and a door presenter assembly.

In response to the mechanical switch 74 being pressed, the latch assembly 68 is configured to unlock the first door 12 if the first door 12 is not already unlocked, and the door presenter assembly 66 is configured to present the first door 12. Presenting the first door 12 refers to the door presenter assembly 66 moving the first door 12 to a partially open position. The partially open position is a position of the first door 12 between a fully closed position and a fully open position. In one example, the door presenter assembly 66 is configured to move, and in particular rotate, the first door 12 to a position in which the rear edge 18 of the first door 12 has traveled a distance of about 40 mm relative to the fully closed position. In this regard, with reference to FIG. 7, the door presenter assembly 66 includes, in one example, a linearly moveable arm 90 capable of projecting relative to the first door 12 by a distance of about 40 mm, and which is configured to selectively engage a body of the vehicle 10 to move the first door 12 to the partially open position. The door presenter assembly 66 and arm 90 are able to generate enough force to open the first door 12 even in cold weather conditions, such as when ice forms on the first door 12.

Figure 8:
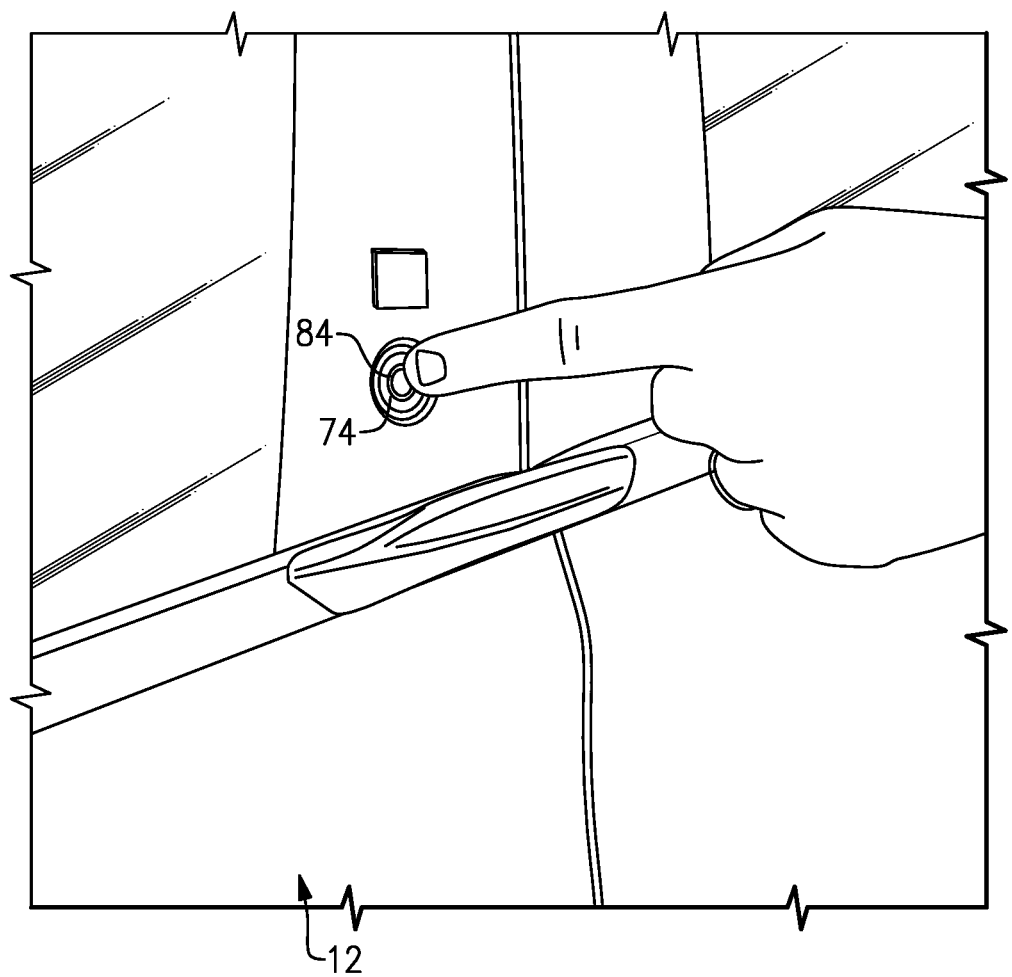
FIG. 8 illustrates a user pressing a mechanical switch of the switch assembly of the first door.
Figure 9:
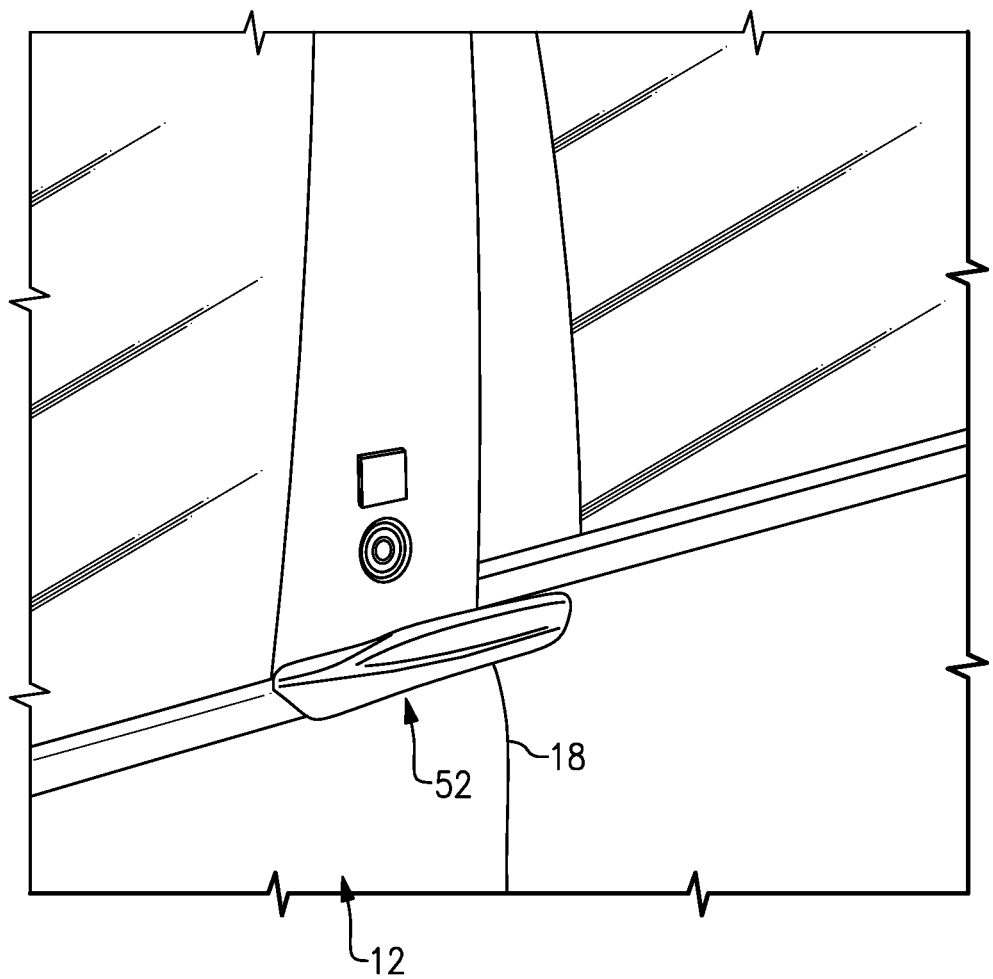
FIG. 9 is a view similar to FIG. 8 and illustrates the first door in a partially open position.
Figure 10:
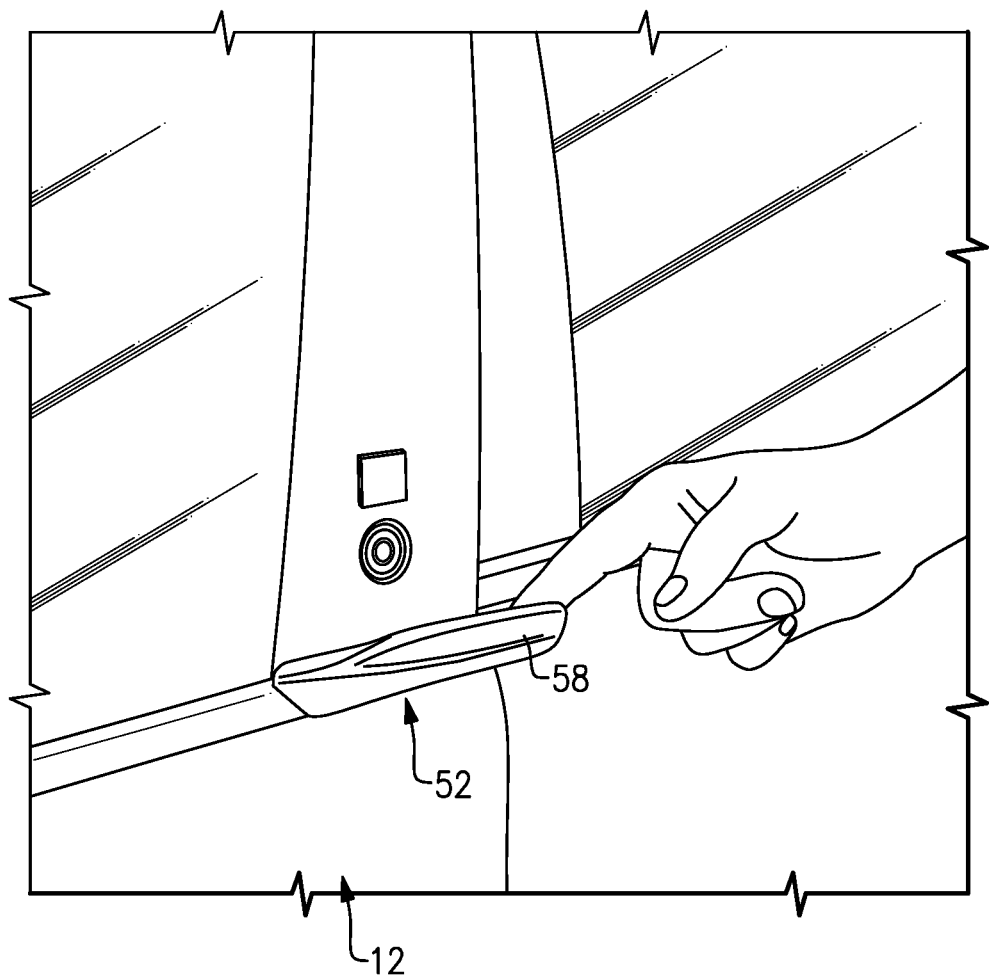
FIG. 10 is a view similar to FIGS. 8 and 9 and illustrates a user applying a force to the fixed door handle.

FIGS. 8-10 are representative of an example door opening sequence. In FIG. 8, the first door 12 is in a fully closed position and a user is pressing the mechanical switch 74. The user is directed to the mechanical switch 74 by the light 84, which is illuminated. The mechanical switch 74 generates a signal in response to being pressed. In response to that signal, the latch assembly 68 unlocks the first door 12 and the door presenter assembly 66 moves the first door 12 to the partially open position, which is shown in FIG. 9.

Before unlocking the first door 12, the vehicle 10 may perform one or more authorization steps before or after the mechanical switch 74 is pressed to confirm that the first door 12 should be unlocked. Example authorization steps include identifying whether a keyfob or mobile device of the user is within range of the vehicle 10. As another example authorization step, the user may input a predetermined alphanumeric code via a keypad on the exterior of the vehicle 10. After authorization and/or as the first door 12 unlocks, the light 84 may flash in sync with flashing of the headlamps and/or taillamps of the vehicle 10.

FIG. 9 illustrates the first door 12 in the partially open position. In the partially open position, the rear edge 18 of the first door 12 has moved about 40 mm relative to the fully closed position by the door presenter assembly 66. In this position, the user can readily apply force to a portion of the first door 12 to manually move the first door 12 to the fully open position. In particular, the rear edge 18 of the first door 12 and the fixed door handle 52 are readily accessible and in a position such that a user can readily contact and apply a force to the first door 12.

In FIG. 10, the user is using the fixed door handle 52 to move the first door 12 to the fully open position, and in particular has placed their index finger into the slot 54. The user is using their index finger to apply a force to a surface of the second leg 58 to manually move the first door 12 to the fully open position. After fully opening the first door 12, the user may enter the vehicle 10 and close the first door 12 using a handle on an interior surface of the first door 12. After exiting the vehicle 10 and closing the first door 12, the user may lock the first door 12 by pressing the capacitive switch 76.

Figure 11:
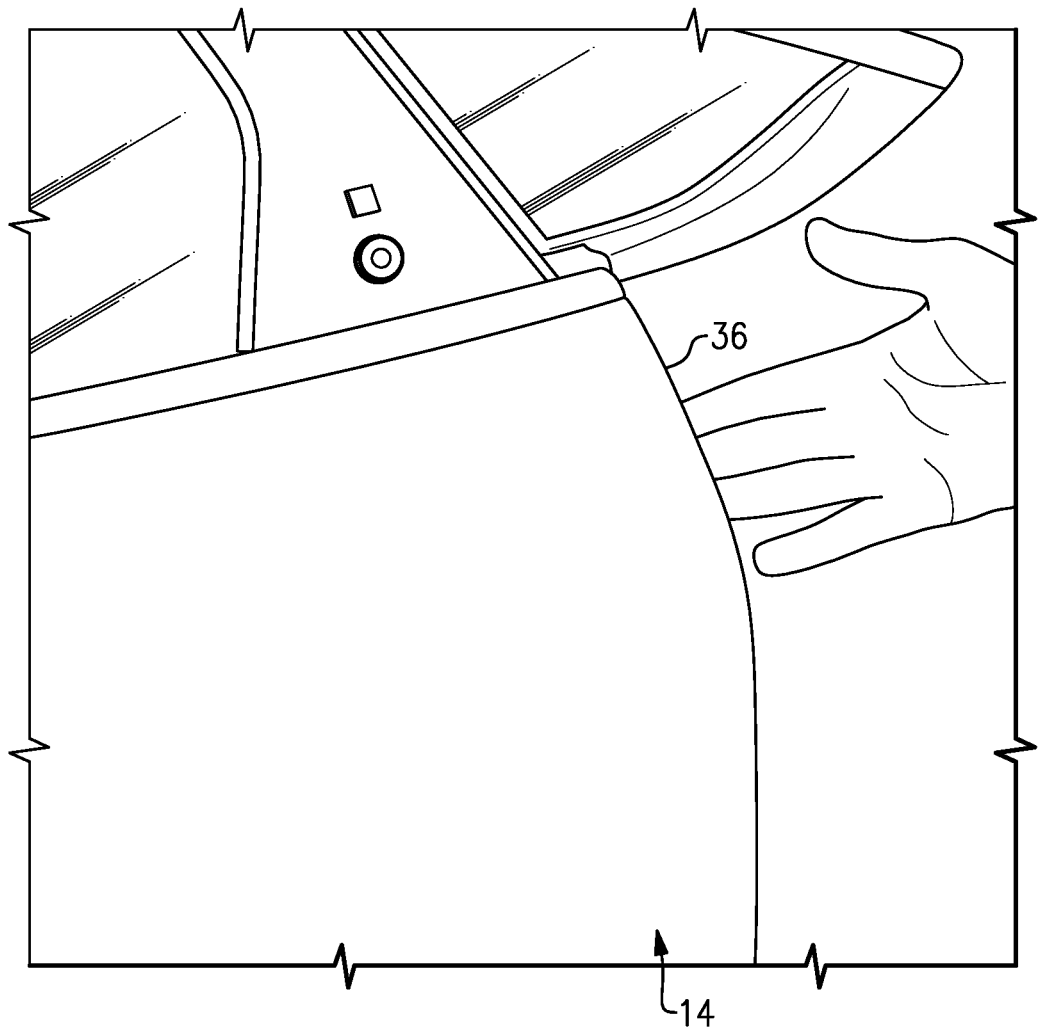
FIG. 11 is a view of a second door of the motor vehicle in a partially open position with a user applying a force to the second door.
Figure 12:
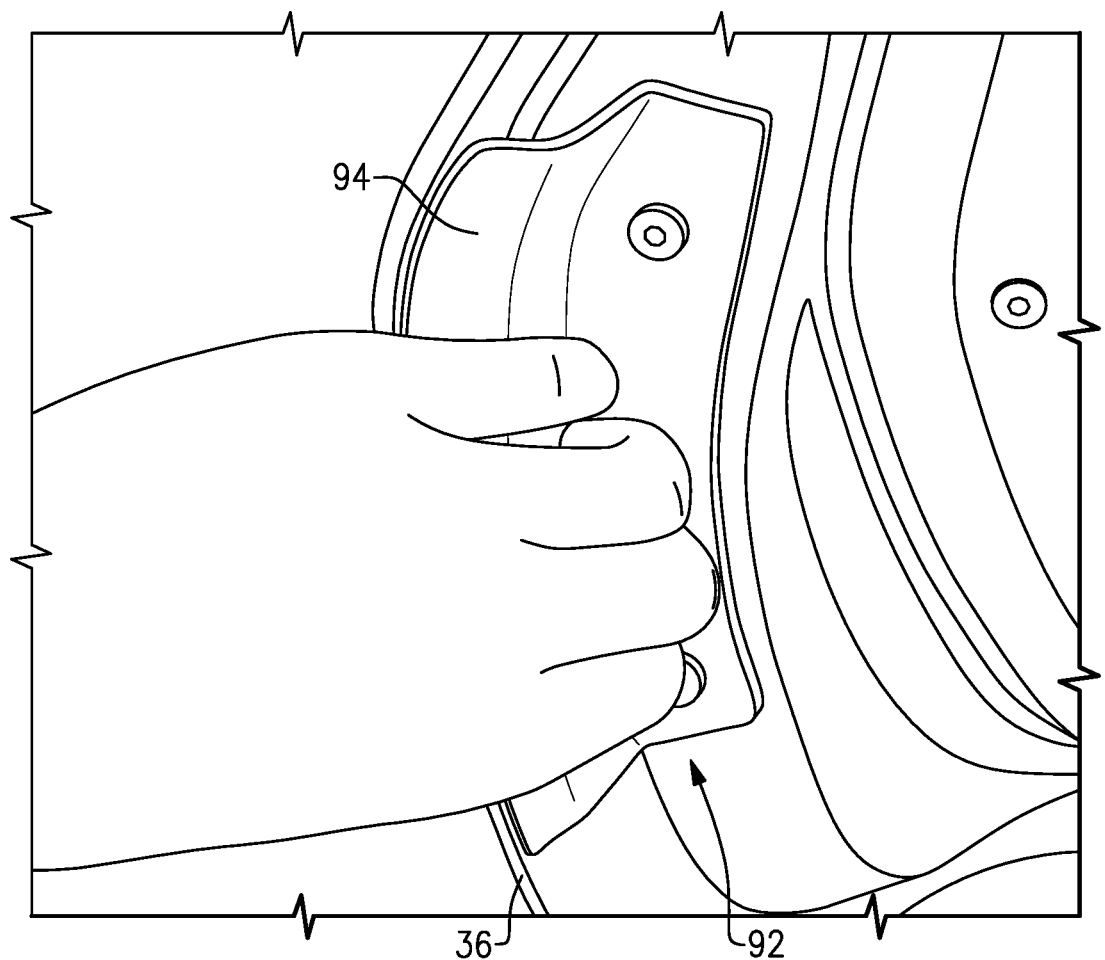
FIG. 12 illustrates a user touching a gripping pad of the second door.

Relative to the second door 14, which does not include a fixed door handle, a user may manually move the second door 14 from the partially open position to the fully open position by grasping a hem of the door adjacent the rear edge 36, as shown in FIG. 11. The hem 92 may include a gripping pad 94 providing a place for a user to comfortably rest their fingers, as shown in FIG. 12.

An aspect of this disclosure relates to situations in which the door presenter assembly 66 and/or the latch assembly 68 simultaneously receives signals from both the mechanical switch 74 and the capacitive switch 76. Such situations may include situations where the switch assembly 64 is contacted without intention to either lock, unlock, or open the first door 12. Such contact may be from a user, water, rain, etc. As examples, a user may lean on the first door 12, and in doing so may come into contact with the switch assembly 64. Likewise, when washing the vehicle 10 or when driving the vehicle 10 in the rain, water may contact the switch assembly 64 and activate the mechanical and capacitive switches 74, 76. In general, when simultaneous signals are generated by both the mechanical switch 74 and the capacitive switch 76, neither the door presenter assembly 66 nor the latch assembly 68 is responsive to either of those signals. In other words, the door presenter assembly 66, the latch assembly 68, and controller 70 are configured to disregard simultaneous signals from the mechanical and capacitive switches 74, 76, at least for a period of time, as discussed in more detail below. In this way, unintentional activation of the door presenter assembly 66 and/or the latch assembly 68 is prevented.

Another aspect of this disclosure relates to an override of the aforementioned aspect of the disclosure. In particular, in one example, after continuously receiving the simultaneous signals from the mechanical switch 74 and the capacitive switch 76 for the period of time, and if the simultaneous signals persist, the door presenter assembly 66 and latch assembly 68 are responsive to the signal from the mechanical switch 74 and not the signal from the capacitive switch 76. In this way, in situations where the vehicle 10 is outside in the rain, for example, and a user desires to unlock and open the first door 12, the fact that rain water is acting upon the capacitive switch 76 will not prevent a user from opening the first door 12. In an example, in rainy conditions, the user has to press and hold the mechanical switch 74 for a period of time, during which simultaneous signals may be sent. The period of time is 750 milliseconds in one example. After the period of time, the door presenter assembly 66 and latch assembly 68 cease disregarding both signals and only disregard the signal from the capacitive switch 76. In other words, after the period of time, the door presenter assembly 66 and latch assembly 68 are responsive to the signal from the mechanical switch 74. The user may alternatively need to double tap the mechanical switch 74 by pressing the button twice in quick succession. In an example, the controller 70 (i.e., either a central controller or the controllers of the door presenter and latch assemblies 66, 68) is able to identify a situation where the first door 12 should be opened despite a simultaneous signal when the controller 70 first receives a signal from the capacitive switch 76. In particular, rain, for example, will not likely be able to press the mechanical switch 74. Thus, in rain, the capacitive switch 76 may create a persistent, continuous signal, and the controller 70 may be programmed to essentially ignore that signal and respond to the pressing of the mechanical switch 74 using one of the above-mentioned techniques, such as requiring the user to press and hold the mechanical switch 74 for a period of time or provide a double tap.

Another aspect of this disclosure relates to avoiding a situation in which a user may become locked out of the vehicle 10 when a main battery pack of the vehicle 10 is fully or substantially depleted. Ordinarily, the switch assembly 64, the door presenter assembly 66, and the latch assembly 68 are powered by a main battery pack of the vehicle 10, which may be a battery pack configured to deliver power to propel the vehicle 10 when the vehicle 10 is a BEV. In this aspect of the disclosure, however, one or more of the switch assembly 64, the door presenter assembly 66, and the latch assembly 68 includes a reserve battery pack. The reserve battery pack may include one or more standard-sized batteries, such as AA batteries. The reserve battery pack may be mounted in the first door 12 and may hold enough power to unlock the latch assembly 68 and cause the door presenter assembly 66 to move the first door 12 to the partially open position. In a particular example, the capacitive switch 76 is not permitted to draw power from the reserve battery pack. Again, because the capacitive switch 76 may be responsive to rain, the capacitive switch 76 may deplete the reserve battery pack when the vehicle 10 is left outside for an extended period of time. In this aspect of the disclosure, the mechanical switch 74 is hard-wired to the reserve battery pack, the door presenter assembly 66, and the latch assembly 68, thereby providing the first door 12 with an independently powered system configured to open the first door 12 even in situations where the vehicle 10 is otherwise low on power.

Directional terms such as "vertical," "upward," "downward," "forward," "rearward," etc., are used herein for purposes of explanation and with reference to the orientation of components illustrated in the drawings. Such directional terms should not be considered limiting. Further, it should be understood that terms such as "generally," "substantially," and "about" are not intended to be boundaryless terms, and should be interpreted consistent with the way one skilled in the art would interpret those terms.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:
1. A door assembly for a motor vehicle, comprising:
a door free of moveable exterior door handles, wherein the door is mounted relative to an opening in a body of the motor vehicle such that the door is moveable between a fully closed position, a fully open position, and a partially open position between the fully closed and fully open positions;
a switch assembly including a mechanical switch configured to generate a signal when pressed;
a door presenter assembly configured to move the door from the fully closed position to the partially open position in response to the signal from the mechanical switch; and
a fixed door handle, wherein the fixed door handle includes a first leg and a second leg spaced-apart from one another by a slot open facing a rear of the motor vehicle, wherein the fixed door handle projects outward from a vertical location adjacent a trim covering a top edge of a main body panel of the door, wherein the trim extends along a bottom of a border of a window opening of the door, wherein the fixed door handle includes a bottom wall extending between the first leg and the second leg and providing a bottom boundary of the slot.

2. The door assembly as recited in claim 1, further comprising a latch assembly configured to selectively lock and unlock the door, wherein the latch assembly is configured to unlock the door in response to the signal from the mechanical switch.

3. The door assembly as recited in claim 2, wherein:
the switch assembly includes a capacitive switch configured to generate a signal when pressed, and
the latch assembly is configured to lock the door in response to the signal from the capacitive switch.

4. The door assembly as recited in claim 2, wherein at least one of the switch assembly, the door presenter assembly, and the latch assembly includes a reserve battery.

5. The door assembly as recited in claim 1, wherein the switch assembly is mounted relative to an applique adjacent a rear edge of the door.

6. The door assembly as recited in claim 5, wherein:
the fixed door handle is configured to permit a user to manually move the door from the partially open position to the fully open position.

7. The door assembly as recited in claim 6, wherein:
the door includes trim,
the fixed door handle is vertically aligned with the trim such that the fixed door handle is provided at a same vertical location along the door as a portion of the trim, and
wherein the fixed door handle exhibits substantially the same height as the trim.

8. The door assembly as recited in claim 6, wherein a portion of the fixed door handle projects rearward of the rear edge of the door.

9. The door assembly as recited in claim 6, wherein the door is a front door of the motor vehicle.

10. The door assembly as recited in claim 1, wherein the slot is sized so as to fit no more than three fingers of an average-sized adult hand.

11. The door assembly as recited in claim 1, wherein:
the mechanical switch includes a button having a perimeter and a light arranged within the perimeter of the button,
the light is configured to illuminate in the form of a ring, and
the button covers the light and is semi-transparent such that, when the light is activated, the light is visible through the button.

12. The door assembly as recited in claim 1, wherein the first and second leg converge at a nose forward of the slot, and wherein the nose gradually tapers moving in a forward direction of the motor vehicle.

13. The door assembly as recited in claim 1, wherein the second leg extends in a direction outward from the door at an acute angle relative to a ground surface.

14. The motor vehicle as recited in claim 1, wherein the bottom wall extends between the first the first leg and the second leg over an entirety of a length of the slot.

15. A motor vehicle, comprising:
a door free of moveable exterior door handles, wherein the door is mounted relative to an opening in a body of the motor vehicle such that the door is moveable between a fully closed position, a fully open position, and a partially open position between the fully closed and fully open positions;
a switch assembly including a mechanical switch configured to generate a signal when pressed, wherein the switch assembly further includes a capacitive switch;
a door presenter assembly configured to move the door from the fully closed position to the partially open position in response to the signal from the mechanical switch, wherein the door presenter is not responsive to a signal from the mechanical switch if simultaneous signals are generated by both the mechanical switch and the capacitive switch; and
a fixed door handle, wherein the fixed door handle is configured to permit a user to manually move the door from the partially open position to the fully open position, wherein the fixed door handle is vertically aligned with a trim adjacent a top edge of a main body panel of the door such that the fixed door handle is provided at a same vertical location along the door as a portion of the trim, wherein the trim extends along a bottom of a border of a window opening of the door.

16. The motor vehicle as recited in claim 15, wherein:
the switch assembly is mounted relative to an applique of the door,
the fixed door handle exhibits substantially the same height as the trim,
the fixed door handle provides a slot open facing a rear of the vehicle, and
a portion of the fixed door handle projects rearward of the rear edge of the door.

17. The motor vehicle as recited in claim 15, wherein:
the door is a front door of the motor vehicle,
the motor vehicle further comprises a rear door,
the rear door is free of any exterior handles,
the rear door includes a switch assembly including a mechanical switch, and
the rear door includes a door presenter configured to move the rear door to a partially open position in response to a signal from the mechanical switch of the rear door.

18. The motor vehicle as recited in claim 15, wherein the fixed door handle is a color matching a color of the trim.

19. The motor vehicle as recited in claim 18, wherein:
the fixed door handle includes a first leg and a second leg spaced-apart from one another by a slot open facing a rear of the motor vehicle,
the first and second leg converge at a nose forward of the slot, and
the nose gradually tapers moving in a forward direction of the motor vehicle such that the fixed door handle visually blends into the trim.

20. The motor vehicle as recited in claim 15, wherein the fixed door handle projects outward from the trim from a location adjacent a bottom of an applique, wherein the applique extends vertically upwardly from the trim and provides a rear border of the window opening.

21. The motor vehicle as recited in claim 15, wherein, if the simultaneous signals are present for a predefined period of time, then, following the predefined period of time, the door presenter will only ignore the signal from the capacitive switch and will respond to the signal from the mechanical switch.

22. A method, comprising:
disregarding for a period of time simultaneous signals from a capacitive switch and a mechanical switch of a switch assembly of a door of a motor vehicle such that a latch assembly and a door presenter assembly are not responsive to the simultaneous signals for the period of time; and after the period of time, if the simultaneous signals persist, activating the door presenter assembly and the latch assembly.

23. The method as recited in claim 22, further including, after the activating step, manually moving the door to a fully open position using a fixed door handle on an exterior of the door.

\* \* \* \* \*